INVENTORS
Elmer A. Herider
James Cumming
BY
THEIR ATTORNEYS

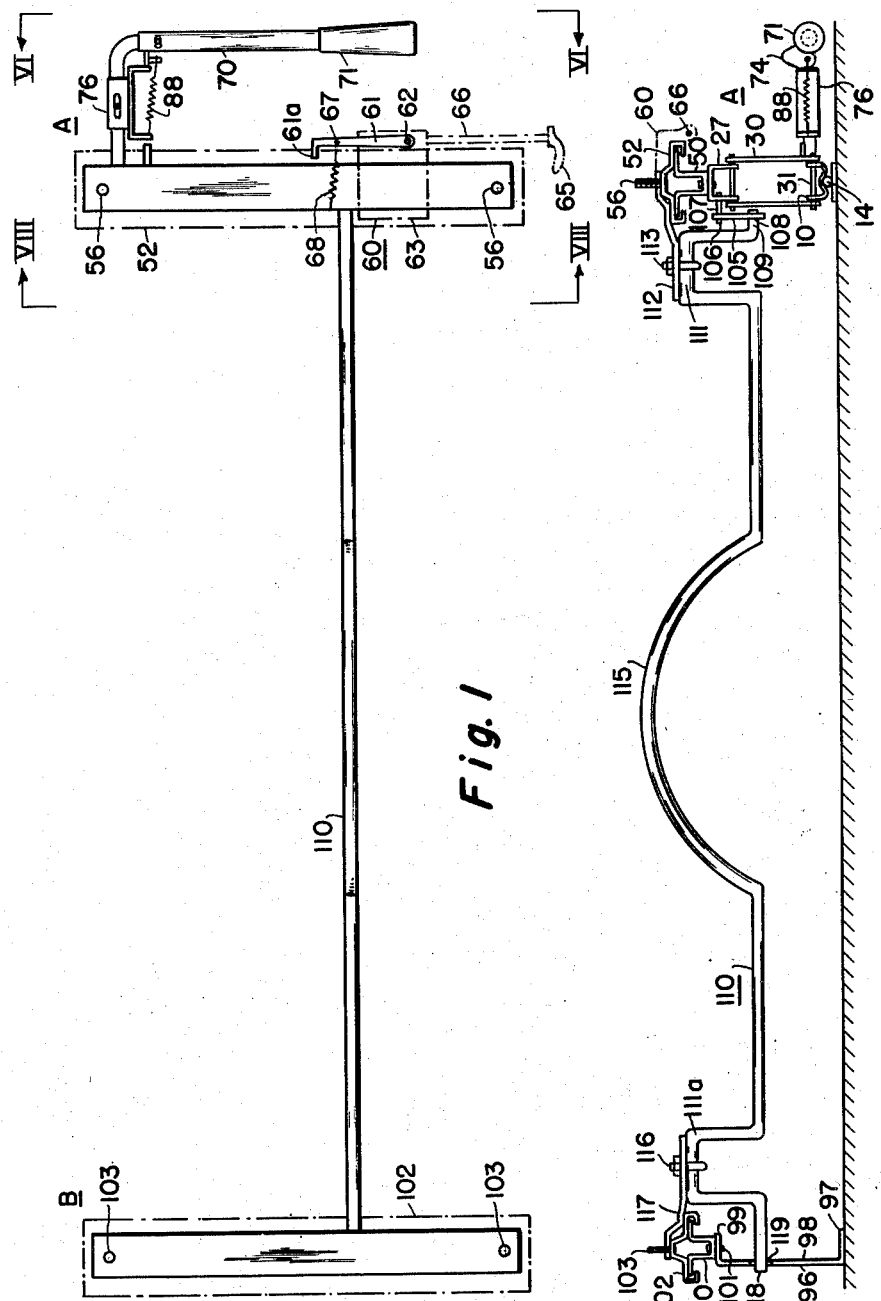

May 21, 1957  E. A. HERIDER ET AL  2,792,873
VERTICALLY ADJUSTABLE SEAT SUPPORT
Filed April 14, 1955  5 Sheets-Sheet 3
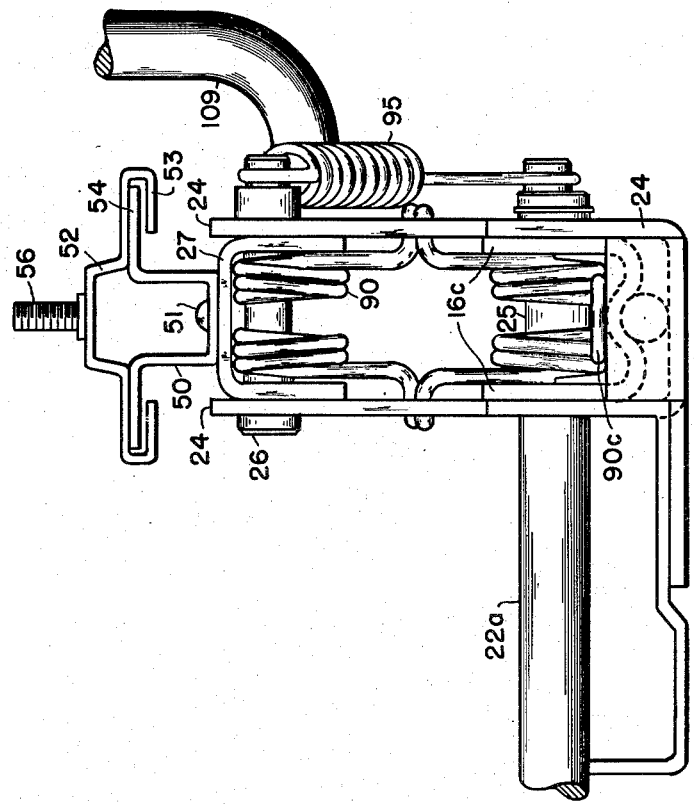
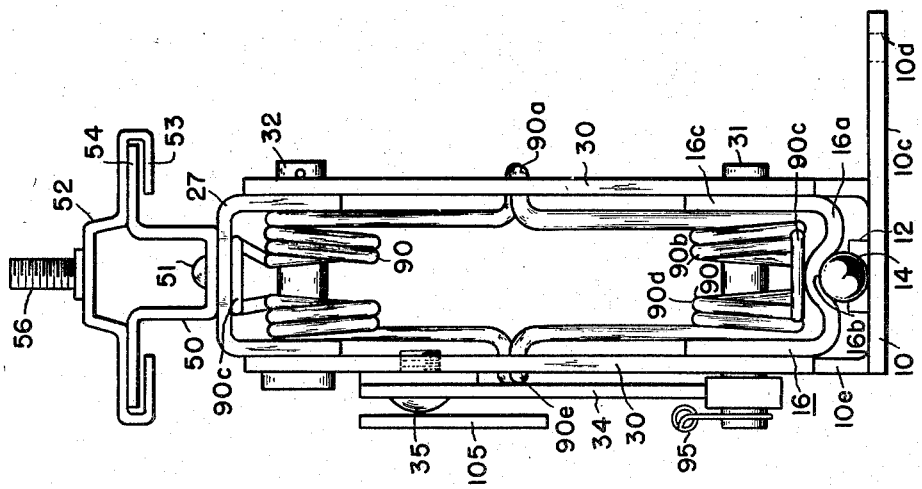
INVENTORS.
Elmer A. Herider
BY James Cumming
THEIR ATTORNEYS INVENTORS.
Elmer A. Herider
James Cumming
BY
THEIR ATTORNEYS May 21, 1957 — E. A. HERIDER ET AL — 2,792,873
VERTICALLY ADJUSTABLE SEAT SUPPORT
Filed April 14, 1955 — 5 Sheets-Sheet 5

INVENTORS.
Elmer A. Herider
James Cumming
BY
THEIR ATTORNEYS

United States Patent Office 2,792,873
Patented May 21, 1957

2,792,873

VERTICALLY ADJUSTABLE SEAT SUPPORT

Elmer A. Herider, Dearborn Township, Wayne County, and James Cumming, Detroit, Mich., assignors to Rockwell Spring and Axle Company, Coraopolis, Pa., a corporation of Pennsylvania Application April 14, 1955, Serial No. 501,298

5 Claims. (Cl. 155—14)

This invention relates to a vertically adjustable seat support adapted to support the front seat of an automobile. The support can be adjusted upwardly and downwardly and the seat can be slid fore and aft relative to the support. In supporting a seat, two seat supports are employed, one at each side of the seat, each of the supports extending in a fore-and-aft direction.

In the accompanying drawings which illustrate a preferred embodiment of the invention, Figure 1 is a diagrammatic plan view showing two seat supports connected by an equalizer bar for equalizing the fore-and-aft movement at each side of the seat;

Figure 2 is a front elevation of the structure shown in Figure 1;

Figure 4 is an enlarged front elevation of the left-hand seat support taken on the line IV—IV of Figure 3;

Figure 5 is an enlarged rear elevation of the left-hand seat support taken on the line V—V of Figure 3;

Figure 11:
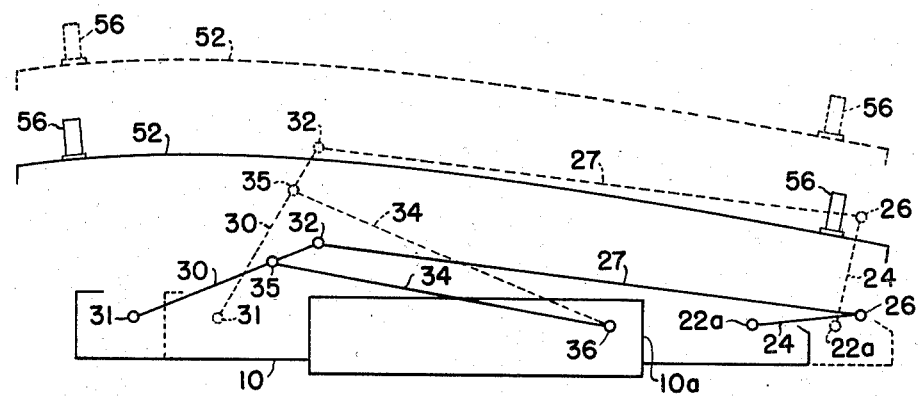
Figure 8:
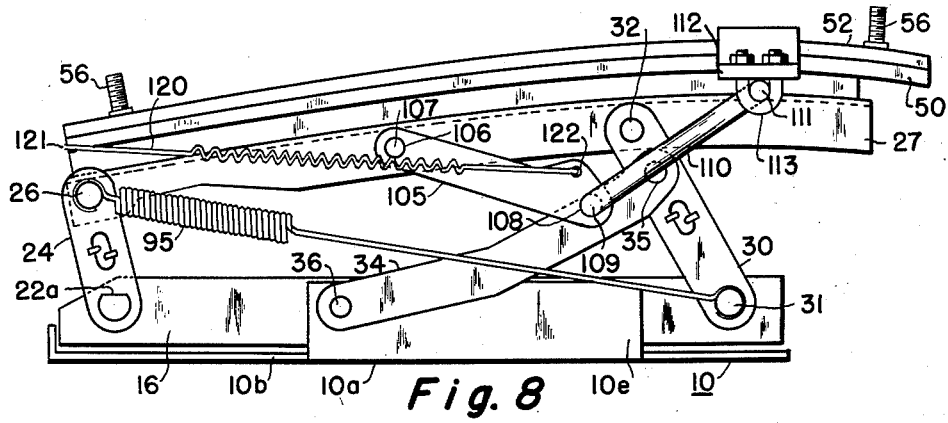
Figures 8 and 9 are side elevations taken on the line VIII—VIII of Figure 1, Figure 8 showing the support in an up position and Figure 9 showing it in a down position.
Figure 9:
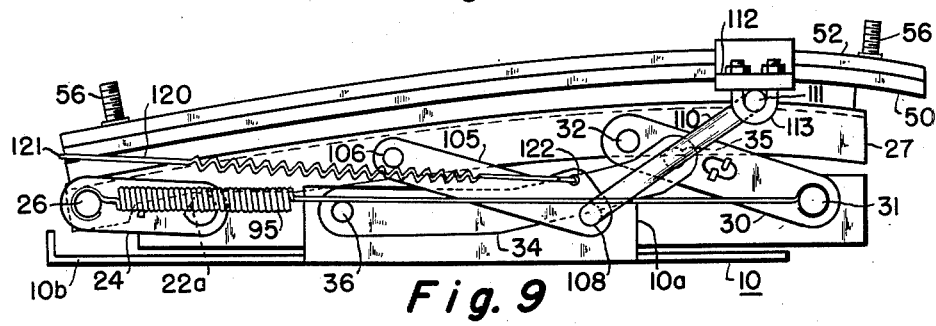
Figure 10:
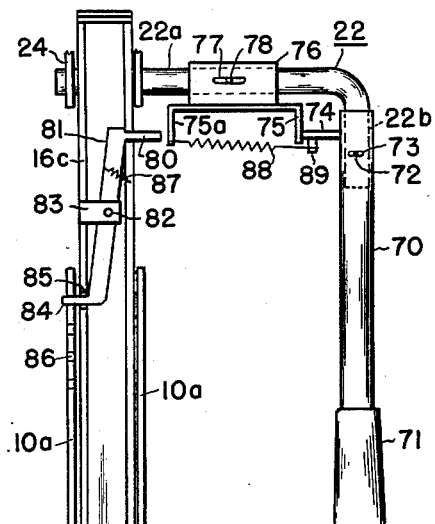

Figure 10 is a partial plan view of the crankshaft, operating tube and handle for actuating the crankshaft to raise and lower the seat support and also illustrating the means for locking the seat support in adjusted vertical position; and Figure 11 is a diagrammatic side elevation of the left-hand seat support showing the support in its down position in full lines and in its up position in dotted lines.

Referring more particularly to the accompanying drawings, the seat, not shown, is supported on two seat supports indicated generally by reference characters A and B (Fig. 1), the left-hand support A being under the driver's side of the seat and the right-hand support B being under the passenger's side of the seat. The left-hand seat support A comprises a base 10 (Fig. 6) having an intermediate portion 10a which is channel-shaped in cross section and two flat end portions 10b. Each end portion 10b has a wing 10c extending from it provided with bolt holes 10d for fastening the base to the vehicle floor. Two bearing retainers 12 are secured to the end portions 10b of the base and ball bearings 14 or other rolling bearings are located in the retainers. A lower support 16 which is channel-shaped in cross section is slidably mounted on the bearings 14 and slides fore and aft within the channel-shaped portion 10a of the base. The web 16a (Fig. 4) of the lower support 16 is provided with a longitudinally extending groove 16b which receives the ball bearings 14. A hold-down roller 18 is supported by a pin 19 which is mounted in the upstanding flanges 10e of the channel-shaped portion of the base 10. The lower support 16 is provided with a slot 20 which receives the pin 19 and allows the lower support 16 to slide fore and aft relative to the base 10.

Figure 3:
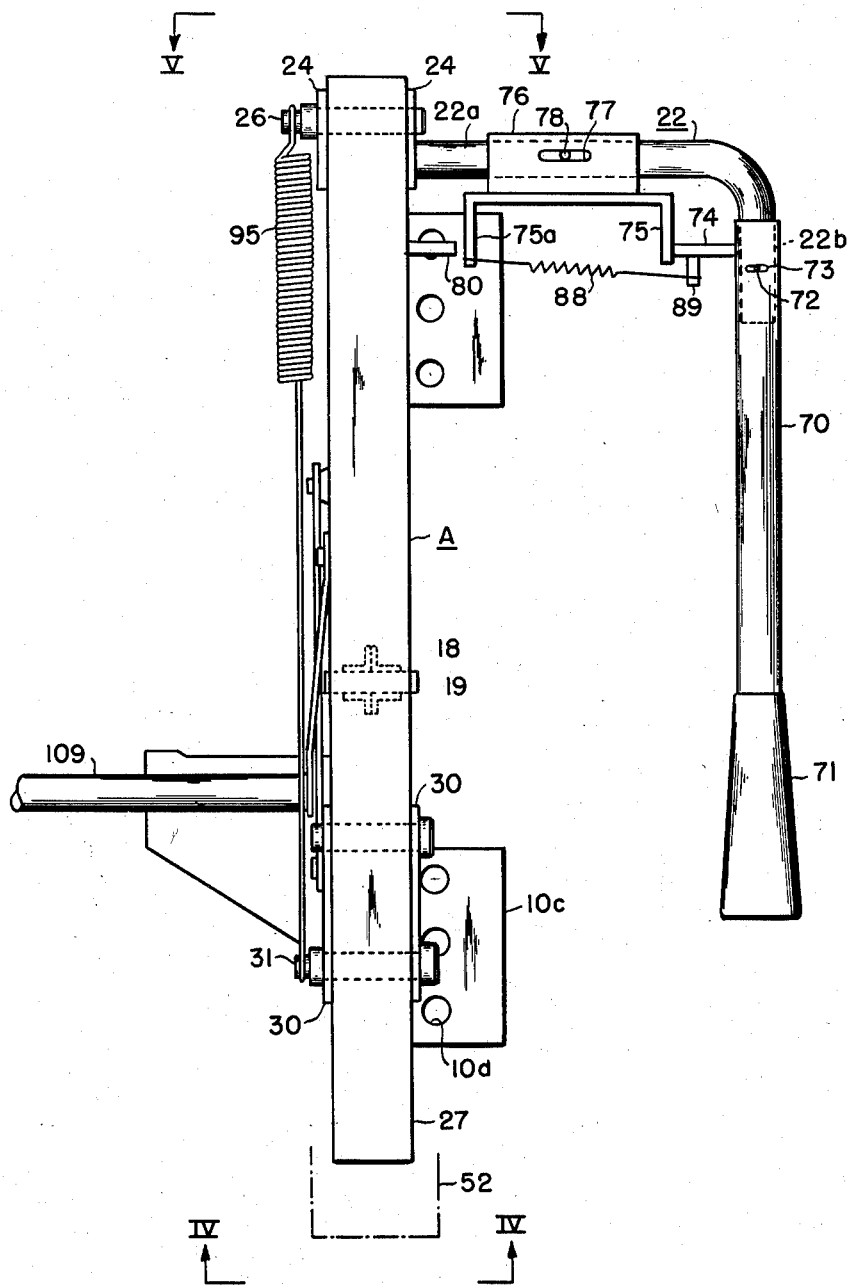
Figure 3 is a partial plan view of the left-hand seat support.
Figure 6:
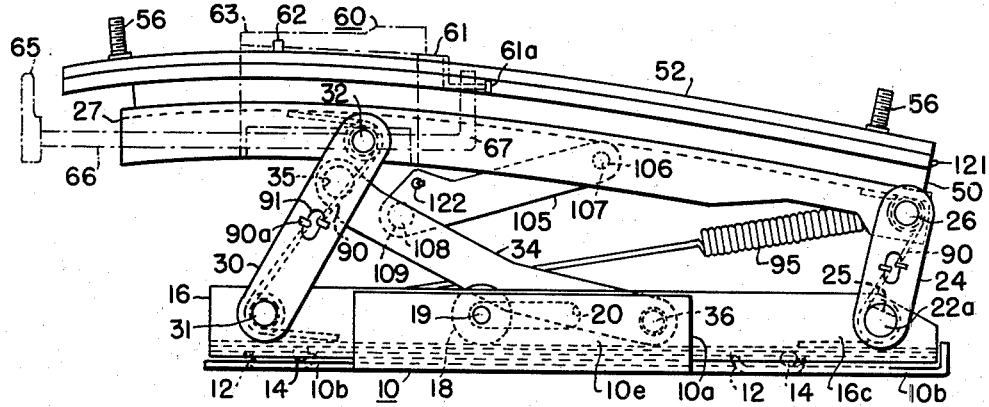
Figures 6 and 7 are side elevations taken on the line VI—VI of Figure 1, Figure 6 showing the seat support in an up position and Figure 7 showing it in a down position.
Figure 7:
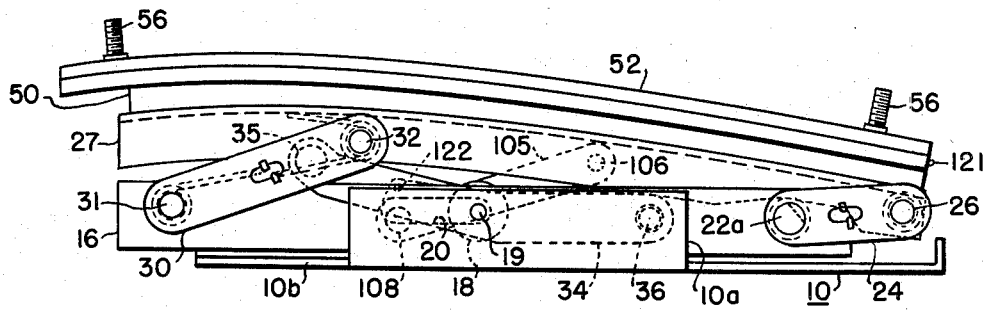

A crankshaft 22 having a shaft portion 22a and a crank portion 22b has its shaft portion 22a rotatably mounted in the upstanding flanges 16c of the lower support 16. Rear links 24 constituting a pair are rigidly secured at their lower ends to the shaft 22a by milling two flat surfaces 25 in the shaft 22a and by providing the links 24 with correspondingly shaped holes having flat portions. The upper ends of the links 24 are pivotally connected at 26 to the rear end of an upper support 27. This support is curved slightly upwardly and forwardly as shown in Figure 6.

Front links 30 constituting a pair are pivotally connected at 31 to the lower support 16 and are pivotally connected at 32 to the upper support 27. A stabilizing link 34 is pivotally connected at 35 to one of the front links 30 and is pivotally connected at 36 to one of the flanges of the channel-shaped portion 10a of the base 10.

A lower seat track 50 (Fig. 4) is secured by rivets 51 to the upper support 27. An upper seat track 52 has flanges 53 which embrace the outturned flanges 54 of the lower seat track. The upper seat track is adapted to slide in a fore-and-aft direction on the lower seat track in a known manner. The upper seat track 52 has studs 56 secured to it for connecting a seat, not shown, to the upper track 52. The upper track 52 and the lower track 50 may be locked together or released by a locking mechanism of known construction, such as that indicated generally by reference numeral 60 shown in Figures 1 and 6. The lock 60 comprises a latch 61 pivoted at 62 to a bracket 63 secured to the upper seat track 52. The latch 61 has a portion 61a which operates in a slot in the upper track and enters between the teeth of a rack provided on the flange 54 of the lower track 50. The latch 61 is operated to release the upper and lower seat tracks by turning a handle 65 secured to a shaft 66 and having a crank portion 67 pivotally connected to the latch 61. A spring 68 urges the latch 61 into locking position.

As shown in Figure 10, the crank portion 22b of crankshaft 22 fits into an operating tube 70 provided with a handle 71 adapted to be grasped by the operator. A pin 72 secured to the crank portion 22b operates in a slot 73 provided in the tube 70 so that the tube can be rotated about its longitudinal axis, the pin 72 moving in slot 73. A cam 74 is rigidly secured to the tube 70. Upon rotation of the tube 70, the cam 74 contacts a slide 75 which is slidably supported on the crankshaft by means of a bracket 76 provided with a slot 77 which receives a pin 78 secured to the crankshaft. Rotation of the tube 70 in one direction causes the slide 75 to move to the left as viewed in Figure 10. The slide 75 has a portion 75a which cooperates with an arm 80 of a bell crank lever 81 which is pivoted at 82 to a bracket 83 secured to the lower support 16. The lever 81 has a latch portion 84 which is received in a slot 85 in the lower support 16 and which also is received in any one of several slots 86 formed in a flange of the channel-shaped intermediate portion 10a of the base 10. A tension spring 87 secured to the lever 81 and to the lower support 16 normally urges the latch portion 84 into locked position. A tension spring 88 is connected to the part 75a of slide 75 and to a pin 89 carried by cam 74, the spring 88 normally urging the part 75a of the slide out of contact with the arm 80 so that spring 87 urges the latch 84 into locking position. As hereinafter explained, in raising or lowering the upper support 27, the lower support 16 slides relative to the base 10. Thus, locking lower support 16 to base 10 prevents raising or lowering upper support 27.

Four torsion springs 90 (Fig. 4) are provided for urging the supporting links 30 and 24 to rotate in a direction to raise the upper support 27 in order to aid the operator in raising the seat by depressing the operating handle 71. A pair of these torsion springs 90 cooperates with the front links 30 and a second pair cooperates with the rear links 24. One end 90a (Fig. 6) is passed through an opening 91 in the link and hooked to the link. The intermediate portion of the spring is formed in a coil 90b which is coiled around one of the pivots 31, 32, 22a or 26 and is then formed in a loop 90c which presses against either the lower support 16 or the upper support 27 as the case may be. The spring is then coiled at 90d around its pivot and the other end 90e is secured to the same link as that to which the end 90a is secured.

The operation of raising the upper support 27 relative to the base 10 and lower support 16 is as follows. The handle 71 and operating tube 70 are rotated about the longitudinal axis of tube 70, thereby moving the slide 75 and releasing latch portion 84 of lever 81 from engagement with a slot 86 in base 10. The operator then presses down on the handle 71, thus moving the tube 70 downwardly and rotating the shaft 22a in a counterclockwise direction as viewed in Figure 6. Since the shaft 22a is rigidly secured to the links 24, these links as well as the front links 30 rotate in a counterclockwise direction. However, since the stabilizing link 34 is pivotally connected to the front link 30 and to the base 10, instead of the links 30 and 24 pivoting about fixed pivots 31 and 22a, the pivots 31 and 22a move to the right as viewed in Figure 6, thus causing the lower support 16 to slide to the right on the base 10. Due to the sliding movement of the lower support on the base, rotation of the supporting links 30 and 24 causes vertical movement of the upper support 27 without any substantial fore-and-aft movement of the upper support. Since the upper track 52 is locked to the lower track 50 and since the lower track is secured to the upper support 27, the upper track 52 likewise moves vertically but not in a fore-and-aft direction. When the seat support has been raised vertically to the desired position, the operating tube 70 is rotated about its longitudinal axis in a direction to release cam 74 (Fig. 10) from slide 75. Spring 88 then moves slide 75 to the right as viewed in Figure 10 to disengage part 75a from arm 80. Spring 87 then rotates lever 81 clockwise about its pivot 82 and engages latch portion 84 in a slot 86 in base 10.

Lowering of the seat is accomplished by the operator rotating handle 71 about its longitudinal axis to release latch portion 84 from slot 86 and then raising the handle. In order to limit the extent to which the seat can be lowered, a tension spring 95 is secured at one end to the pivot 31 on the lower support 16 and at the other end to the pivot 26 on the upper support 27.

The manner in which the seat support A on the driver's side is raised and lowered has been described. The passenger's side of the seat is supported by a seat support indicated generally by the reference character B (Figs. 1 and 2). The support B comprises a base 96 having a horizontal flange 97 secured to the floor of the car, an upstanding web 98 and an upper horizontal flange 99. A lower seat track 100 is secured by rivets 101 to the flange 99. An upper seat track 102 is adapted to slide fore and aft on the lower seat track and is provided with studs 103 for fastening the seat to the upper seat track. There is sufficient looseness between the upper seat track 102 and the lower seat track 100 to allow the seat support A to be raised and lowered the slight distance required without providing any other hinge means on the seat support B. Thus, the device illustrated and described is essentially a vertically adjustable one-sided seat support in which the driver's side can be raised and lowered while the passenger's side supported by the support B remains in substantially the same vertical position. Of course, the seat support B could be made similar to the seat support A if it were desired to make both of these supports vertically adjustable.

In order to enable fore-and-aft sliding of the upper track 52 on the lower track 50, fore-and-aft movement of the upper track 102 on the lower track 100 and to equalize the movement on both sides of the seat, the following arrangement is provided. An equalizer link 105 is pivoted at 106 on a pin 107 secured to the upper support 27. The lower end of the link 105 is pivoted at 108 to an arm 109 of an equalizer bar 110 having two crank portions 111 and 111a. One of the crank portions 111 is pivotally supported from a bracket 112 by a U bolt 113. The bracket 112 is secured to the upper seat track 52.

The equalizer bar 110 is provided with a curved portion 115 conforming generally to the hump in the floor of the vehicle. The crank portion 111a of the equalizer bar 110 is pivotally supported by a U bolt 116 from a bracket 117 secured to the upper seat track 102. The end 118 of the equalizer bar 110 extends through a vertical slot 119 in the base 96. As shown in Figure 6, a tension spring 120 has one end 121 secured to the upper seat track 52 and the other end secured to a pin 122 carried by the equalizer link 105. The spring 120 urges the upper seat track 52 forwardly with respect to the lower seat track 50.

In moving the seat fore or aft, the locking device 60 shown in Figure 6 is operated to release the upper seat track from the lower seat track by rotating handle 65 as previously described and the upper seat tracks 52 and 102 are slid fore or aft. This sliding movement causes rotation of the equalizer link 105 about its pivots 106, 108 and 111. Rotation of the crank 111 causes rotation of crank 111a which causes upper seat track 102 to slide on lower seat track 100 the same distance as upper seat track 52 slides on lower seat track 50, the end 118 sliding up or down in slot 119 during such movement.

In the embodiment shown and described, the front links 30 are longer than the rear links 24. This results in a trapezoidally-shaped system of links. However, the front and rear links can be of equal lengths to form a parallelogrammic-shaped system of links.

The invention is not limited to the preferred embodiment but may be otherwise embodied or practiced within the scope of the following claims.

We claim:

1. A vertically adjustable seat support comprising a base, a lower support slidable fore and aft on said base, an upper support spaced above said lower support, a pair of front supporting links and a pair of rear supporting links pivotally connected adjacent their lower ends to said lower support and pivotally connected adjacent their upper ends to said upper support, means for rotating said links about their pivots to said lower support, a stabilizing link pivotally connected adjacent its lower end to said base and adjacent its upper end to one of said supporting links, and means for locking said lower support in adjusted position on said base.

2. A vertically adjustable seat support comprising a base, a lower support slidable fore and aft on said base, bearing retainers on said base, anti-friction rolling bearings in said retainers and supporting said lower support, a hold-down roller supported by a pin mounted on said base, said pin being received in a slot provided in said lower support, an upper support spaced above said lower support, a pair of front supporting links and a pair of rear supporting links pivotally connected adjacent their upper ends to said upper support, means for rotating said links about their pivots to said lower support, a stabilizing link pivotally connected adjacent its lower end to said base and adjacent its upper end to one of said supporting links, and means for locking said lower support in adjusted position on said base.

3. A vertically adjustable seat support comprising a base, a lower support slidable fore and aft on said base, an upper support spaced above said lower support, a pair of front supporting links and a pair of rear supporting links pivotally connected adjacent their lower ends to said lower support and pivotally connected adjacent their upper ends to said upper support, a stabilizing link pivotally connected adjacent its lower end to said base and adjacent its upper end to one of said supporting links, torsion springs carried by said lower support and connected to said supporting links for rotating said supporting links in a direction to raise said upper support, a crankshaft rigidly connected to a pair of said supporting links at their pivotal connections to said lower support, and means for locking said lower support in adjusted position on said base.

4. A vertically adjustable seat support comprising a base, a lower support slidable fore and aft on said base, an upper support spaced above said lower support, a pair of front supporting links and a pair of rear supporting links pivotally connected adjacent their lower ends to said lower support and pivotally connected adjacent their upper ends to said upper support, a stabilizing link pivotally connected adjacent its lower end to said base and adjacent its upper end to one of said supporting links, torsion springs carried by said lower support and connected to said supporting links for rotating said supporting links in a direction to raise said upper support, a crankshaft rigidly connected to a pair of said supporting links at their pivotal connections to said lower support, a tension spring connected adjacent one end to said upper support and adjacent its other end to said lower support and opposing rotation of said supporting links in a direction to lower said upper support, and means for locking said lower support in adjusted position on said base.

5. A vertically adjustable seat support comprising a base having a channel-shaped portion, a channel-shaped lower support slidable fore and aft in the channel-shaped portion of said base, said lower support having a web and upstanding flanges, the ends of said lower support extending beyond the ends of the channel-shaped portion of said base, an upper support spaced above said lower support, a crankshaft extending tranversely of and rotatably mounted in the upstanding flanges of said lower support adjacent one end thereof, a first pair of supporting links rigidly connected adjacent their lower ends to said crankshaft and pivotally connected adjacent their upper ends to said upper support, a second pair of supporting links pivotally connected adjacent their upper ends to said upper support and adjacent their lower ends to said lower support, a stabilizing link pivotally connected adjacent its lower end to said base and adjacent its upper end to one of said supporting links, torsion springs carried by said lower support and connected to said supporting links for rotating said supporting links in a direction to raise said upper support, and means for locking said lower support in adjusted position on said base.

References Cited in the file of this patent
UNITED STATES PATENTS

| 2,076,309 | Whedon et al. | Aug. 17, 1937 |
| 2,090,579 | Grinnell | Aug. 17, 1937 |
| 2,278,101 | Browne | Mar. 31, 1942 |

FOREIGN PATENTS

| 601,488 | Great Britain | May 6, 1948 |